United States Patent [19]

Callander

[11] 3,909,489

[45] Sept. 30, 1975

[54] POLYESTERS AND COPOLYESTERS HAVING IMPROVED FLAME RETARDANCY

[75] Inventor: Douglas D. Callander, Akron, Ohio

[73] Assignee: The Goodyear Tire & Rubber Company, Akron, Ohio

[22] Filed: Nov. 7, 1973

[21] Appl. No.: 413,479

[52] U.S. Cl.............. 260/45.7 R; 428/97; 428/921
[51] Int. Cl.² .................... C08K 3/38; C08K 5/03
[58] Field of Search.... 260/2.5 AJ, 45.7 R, 45.75 B; 423/276

[56] References Cited
UNITED STATES PATENTS

| | | | |
|---|---|---|---|
| 3,287,312 | 11/1966 | Ling | 260/41 |
| 3,347,822 | 10/1967 | Jenkner | 260/45.75 |
| 3,376,253 | 4/1968 | Burnthall et al. | 260/45.7 |
| 3,549,564 | 12/1970 | Parker et al. | 260/2.5 |
| 3,645,962 | 2/1972 | Schwarz | 260/40 |
| 3,658,634 | 4/1972 | Yanagi et al. | 161/175 |
| 3,688,001 | 8/1972 | Exner et al. | 260/463 |
| 3,725,319 | 4/1973 | Frisch | 260/2.5 |

FOREIGN PATENTS OR APPLICATIONS 1,100,605  1/1968  United Kingdom

*Primary Examiner*—Donald E. Czaja
*Assistant Examiner*—R. A. White
*Attorney, Agent, or Firm*—F. W. Brunner; J. P. Ward

[57] ABSTRACT

Polyesters and copolyesters, derived from the reaction of a dicarboxylic acid or lower alkyl ester thereof with a glycol, which possess improved flame retardant properties as a result of the addition to said polyesters and copolyesters of a synergistic mixture consisting of (1) from 1 to 10 percent by weight of a polyhalogenated aromatic compound selected from the group consisting of halogenated benzene, biphenyl and naphthalene compounds and (2) from 0.1 to 3.0 percent by weight of at least one alkali metal tetrafluoroborate.

9 Claims, No Drawings

POLYESTERS AND COPOLYESTERS HAVING IMPROVED FLAME RETARDANCY

This invention relates to high molecular weight linear polyesters and copolyesters having improved flame retardant characteristics. In particular this invention relates to synergistic combinations of aromatic polyhalogen compounds and an alkali metal tetrafluoroborate which impart improved flame retardance to high molecular weight linear polyesters.

In recent years there has arisen an ever increasing need for making synthetic fibers, particularly those employed in carpeting, home furnishings and wearing apparel applications, more resistant to burning. And more recently the search for synthetic fibers which will fulfill the need has been given added impetus by the adoption of new federal flammability standards for carpeting (DOC-FF-1-70) and children's sleepwear (DOC-F-F-3-71). Various methods have been proposed and placed into practice to meet the need, including surface treatment of fabrics with one or more flame retardant chemicals or incorporation of flame retardant chemicals into synthetic polymers either as an additive or as a chemically bound comonomer. However, these various methods have met with only limited success. For example, the flame retardancy of surface treated fabrics and particularly polyester can be lost when the fabric is washed or drycleaned. Polymers having additives physically mixed or chemically incorporated can yield fibers which are more brittle, of lower tensile strength or possess less resistance to oxidative degradation. Quite obviously if a flame retardant polymer, and particularly a flame retardant polyester or copolyester, could be provided at a reasonable cost and possessing good physical properties it would find widespread acceptance in the current marketplace.

It has now been found that high molecular weight linear polyester and copolyester resins, derived from the reaction of at least one dicarboxylic acid or lower alkyl ester thereof with at least one glycol of the formula $HO(CH_2)_nOH$ wherein n is an integer ranging from 2 to 10, which exhibit reduced flammability can be prepared by adding to said polyesters or copolyesters a synergistic mixture consisting of (1) from 1 to 10 percent by weight, based on the weight of the polyester of halogen atoms as at least one polyhalogenated aromatic compound selected from the group consisting of halogenated benzene compounds of the formula (I) 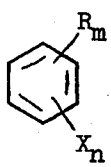

where R is selected from the group consisting of hydrogen atoms and alkyl radicals containing from 1 to 3 carbon atoms, X is selected from the group consisting of bromine and chlorine atoms, $m$ and $n$ are integers where m ranges from 0 to 3 and the sum of $m$ and $n$ is 6, halogenated biphenyl compounds of the formula (II) 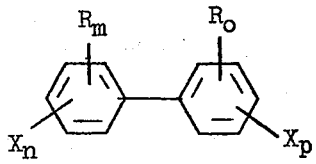

where R is selected from the group consisting of hydrogen atoms, alkyl radicals containing from 1 to 4 carbon atoms and halogen substituted alkyl radicals containing from 1 to 4 carbon atoms in which said halogen atoms are selected from the group consisting of bromine and chlorine, X is selected from the group consisting of bromine and chlorine, $m$, $n$, $o$ and $p$ are integers where m and o range from 0 to 3 and the sum of $m$ and $n$ is 5 and the sum of $o$ and $p$ is 5 and halogenated naphthalene compounds of the formula (III) 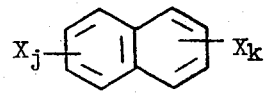

where X is selected from the group consisting of bromine and chlorine atoms and $j$ and $k$ are integers ranging from 2 to 4 and the sum of $j$ and $k$ is $\geq$ 4 and (2) from 0.1 to 3.0 percent by weight, based on the weight of the polyester of at least one compound selected from the group consisting of alkali metal tetrafluoroborates.

It is to be understood that the term "polyester" as used throughout this specification encompasses both homopolyesters and copolyesters.

The term "oxygen index" as used in this application is defined as the minimum volume concentration of oxygen in a rising oxygen/nitrogen atmosphere which will allow a vertically supported polyester sample to burn totally once the sample is ignited at the top. It is a convenient and reproducible method of determining the flammability of the polyester samples.

The polyesters employed in this invention include those derived from dicarboxylic acids or their lower alkyl (i.e., $C_1$ – $C_4$) esters and glycols of the formula $HO(CH_2)_nOH$, where n is an integer from 2 to 10 by such conventional processes as the direct esterification-polycondensation and transesterification-polycondensation processes. The former process involves the reacting together of the desired dicarboxylic acid and glycol to form what is generally referred to in the art as polyester "prepolymer." The esterification reaction is carried out at elevated temperatures and pressures and catalysts may or may not be used. The prepolymer is then polycondensed to high molecular weight polyester under still higher temperatures and reduced pressures in the presence of polycondensation catalysts of which antimony trioxide is but one example. The transesterification-polycondensation process involves the reacting together of a lower alkyl (i.e., $C_1$ – $C_4$) ester of the desired dicarboxylic acid and glycol to form the bis glycol ester of the acid or a mixture of the bis glycol ester and higher oligomers thereof. This reaction is carried out in the presence of transesterification catalysts such as, for example, manganese octanoate at elevated temperatures and pressures. The transesterification product is then polycondensed in the same manner as in the direct esterification-polycondensation process.

Representative examples of dicarboxylic acids useful in preparing the flame retardant compositions of this invention include aliphatic dicarboxylic acids such as adipic acid, azelaic acid, sebacic acid and the like; cycloaliphatic dicarboxylic acids such as hexahydroterephthalic acid and the like and aromatic dicarboxylic acids such as terephthalic acid, isophthalic acid, 2,6- and 2,7-naphthalene dicarboxylic acid, p,p'-diphenyl dicarboxylic acid and the like. In addition, lower alkyl esters of the above acids can be employed such as the dimethyl, diethyl, dipropyl, diisopropyl, dibutyl, diisobutyl and ditertiary butyl esters. Also, mixtures of the above acids or esters can be used to produce copolyesters. Of these acids and lower alkyl esters thereof the terephthalic acid and dimethyl terephthalate are most preferred.

Representative examples of glycols corresponding to the above formula include ethylene glycol, propylene glycol, tetramethylene glycol, neopentyl glycol, hexamethylene glycol, and decamethylene glycol and the like; cyclohexane glycols such as cyclohexane dimethanol; 2,2-bis[4-($\beta$-hydroxyethoxy) phenyl] propane and similar varieties of glycols. As with the dicarboxylic acids or lower alkyl esters thereof, mixtures of these glycols can be employed. Of these glycols ethylene glycol is most preferred.

The polyhalogenated aromatic compounds useful in preparing the flame retardant high molecular weight linear polyesters and copolyester resins of the present invention are defined by the formulae set forth above. Representative examples of the polyhalogenated aromatic compounds defined by formula I include halogenated benzene and the $C_1$ to $C_3$ alkyl derivatives thereof such as hexabromobenzene, hexachlorobenzene, tetrabromobenzene, tetrabromoxylene, pentabromotoluene, pentachlorotoluene and the like; halogenated biphenyl and the $C_1$ to $C_3$ alkyl derivatives thereof such as tetrabromobiphenyl, hexabromobiphenyl, octabromobiphenyl, decabromodiphenyl, 4,4'-dimethyl octabromobiphenyl and the like and the chlorinated analogs thereof and halogenated naphthalene compounds such as tetrabromonaphthalene, hexabromonaphthalene, octabromonaphthalene, decabromonaphthalene and the chlorinated analogs thereof such as tetrachloronaphthalene and the like. Of these polyhalogenated biphenyls are preferred with the brominated biphenyls being the most preferred.

Representative examples of the alkali metal tetrafluoroborates include sodium tetrafluoroborate, potassium tetrafluoroborate and the like.

The above-described polyhalogenated aromatic compounds are added to the molten polyester resin when the desired molecular weight has been obtained. Generally the polyhalogenated aromatic compounds are added when the intrinsic viscosity of the molten polyester is at least 0.4 as determined on a 0.1 gram sample at 30°C. in a 60/40 phenol/s-tetrachloroethane solution.

The alkali metal tetrafluoroborates can be added at any stage during the polyester forming process. Thus the alkali metal tetrafluoroborates can be added at the beginning of, during the course of or after the completion of either the esterification or transesterification. Additionally, the alkali metal tetrafluoroborates can be added to the polyester resin melt at the same time the polyhalogenated aromatic compound is added and generally this is the preferred method.

As noted above, the synergistic mixtures of this invention consist of from 1 to 10 percent by weight of halogen atoms, based on the polyester, as polyhalogenated aromatic compounds defined above. Preferably 3 to 6 percent by weight of halogen atom is employed. Also as noted hereinabove the amount of alkali metal tetrafluoroborate useful in the practice of this invention ranges from 0.1 – 3.0 percent by weight with a range of from 0.25 – 2.0 percent by weight being preferred.

The following example illustrates the invention. The oxygen index (O.I.) of the 10 polyester samples prepared was determined by a modified ASTMD–2863 test procedure wherein the modification consisted of molding the polyester sample to be tested to both sides of an inert framework. For this test plain weave 7.5 oz/sq.yd., 0.1 inch thick glass fabric was used as the insert framework.

EXAMPLE

Ten poly(ethylene terephthalate) samples were prepared as follows. Seventy grams of dimethyl terephthalate, 45 milliliters of ethylene glycol and 0.0253 gram of a transesterification catalyst (in this case manganese acetate) were placed in a reaction vessel and reacted at 180° to 220°C. for a period of 2 hours. Then 0.0176 gram of antimony trioxide was added to the transesterification product, the temperature raised to 255°C. and the pressure reduced to below 1.0 millimeter of mercury over 90 minutes and excess glycol removed. Polycondensation was completed by increasing the reaction temperature to 275°C. and maintaining it thereat for an additional 1 to 2 hours. The polyhalogenated aromatic compound or alkali metal tetrafluoroborate or both were then added to the polymer melt at this time. Sample 1 in the table below was the control sample and did not contain a synergistic mixture of this invention. Samples 2–6 were comparative examples and contained either a polyhalogenated aromatic compound or an alkali metal tetrafluoroborate, but not both. Sample 7– 10 contain both a polyhalogenated aromatic compound and an alkali metal tetrafluoroborate and illustrate the invention. Octabromobiphenyl (OBBP) was the polyhalogenated aromatic compound employed as the source of halogen atoms and either sodium or potassium tetrafluoroborate was the alkali metal tetrafluoroborate employed. The amounts of these compounds added to the molten polyester is expressed as percent by weight of total polyester. All data are set forth in the following table.

| Sample | % $NaBF_4$ | % $KBF_4$ | % Bromine | O.I. |
|---|---|---|---|---|
| 1 | — | — | — | 22.0 |
| 2 | 1 | — | — | 23.0 |
| 3 | — | 1 | — | 23.0 |
| 4 | — | — | 3 | 23.0 |
| 5 | — | — | 5 | 24.5 |
| 6 | — | — | 6 | 25.0 |
| 7 | 1 | — | 3 | 25.0 |
| 8 | — | 1 | 3 | 25.5 |
| 9 | — | 1 | 6 | 28.0 |
| 10 | 0.5 | — | 3 | 25.0 |

From the above table it can be seen that a smaller percentage of the synergistic mixture is required to provide a given level of flame retardancy than is required when only a single constituent is employed. For example, in sample 10 above the use of 3.5 percent by weight of a combination of $NaBF_4$ and bromine as OBBP will give a polymer having a O.I. of 25. By contrast, in Sample 6, 6.0 percent by weight of bromine as OBBP was required to give a polymer having the same degree of flame retardancy. Furthermore, whereas the degree of flame retardancy tends to level out as greater amounts of bromine are employed, the flame retardancy of the polymers continues to increase with increasing amounts of the synergistic mixture and without detrimentally affecting other properties of the polymers.

While certain representative embodiments and details have been shown for the purpose of illustrating the invention it will be apparent to those skilled in this art that various changes and modifications may be made, therein without departing from the spirit or scope of the invention.

What is claimed is:

1. In the preparation of flame retardant high molecular weight linear polyester and copolyester resins prepared by the reaction of at least one dicarboxylic acid selected from the group consisting of aliphatic and aromatic dicarboxylic acids or the lower alkyl esters thereof with at least one glycol of the formula $HO(CH_2)_nOH$ where n is an integer ranging from 2 to 10 the improvement which comprises adding to said polyester and copolyester a flame retardant synergistic mixture consisting of (1) from 1 to 10 percent by weight, based on the weight of the polyester or copolyester, of halogen atom as at least one polyhalogenated aromatic compound selected from the group consisting of; halogenated benzene compounds of the formula (I) 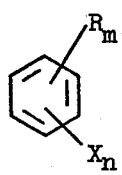

where R is selected from the group consisting of hydrogen atom and alkyl radicals containing from 1 to 3 carbon atoms, X is selected from the group consisting of bromine and chlorine atoms, $m$ and $n$ are integers where $m$ ranges from 0 to 3 and the sum of $m$ and $n$ is 6, halogenated biphenyl compounds of the formula (II) 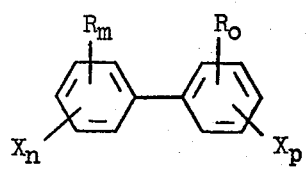

where R is selected from the group consisting of hydrogen atom, alkyl radicals containing from 1 to 4 carbon atoms and halogen substituted alkyl radicals containing from 1 to 4 carbon atoms in which said halogen atoms are selected from the group consisting of bromine and chlorine, X is halogen atom selected from the group consisting of bromine and chlorine, $m$, $n$, $o$ and $p$ are integers where $m$ and $o$ range from 0 to 3 and the sum of $m$ and $n$ is 5 and the sum of $o$ and $p$ is 5 and halogenated naphthalene compounds of the formula (III) 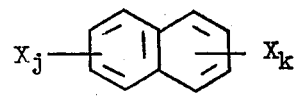

where X is selected from the group consisting of bromine and chlorine atoms and j and k are integers ranging from 2 to 4 and $j + k \geq 4$ and (2) from 0.1 to 3.0 percent by weight, based on the weight of the polyester, of at least one compound selected from the group consisting of alkali metal tetrafluoroborates.

2. The improvement of claim 1 wherein the synergistic mixture consists of (1) from 3 to 6 percent by weight, based on the weight of the polyester or copolyester, of halogen atom as at least one polyhalogenated aromatic compound and (2) from 0.25 to 2.0 percent by weight, based on the polyester or copolyester, of at least one alkali metal tetrafluoroborate.

3. The improvement of claim 1 wherein the halogen atom is bromine atom.

4. The improvement of claim 1 wherein the halogen atom is bromine atom as octabromobiphenyl and the alkali metal tetrafluoroborate is selected from the group consisting of sodium tetrafluoroborate and potassium tetrafluoroborate.

5. A flame retardant, high molecular weight linear polyester or copolyester composition consisting of (A) a polyester or copolyester having an intrinsic viscosity of at least 0.4 as measured on a 0.1 gram sample at 30°C. in a 60/40 phenol/s-tetrachloroethane solvent and (B) a synergistic mixture consisting of (1) from 1 to 10 percent by weight, based on the weight of the polyester or copolyester, of halogen atom as at least one polyhalogenated aromatic compound selected from the group consisting of halogenated benzene compounds of the formula (I) 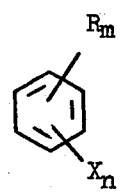

where R is selected from the group consisting of hydrogen atom and alkyl radicals containing from 1 to 3 carbon atoms, X is selected from the group consisting of bromine and chlorine atoms, $m$ and $n$ are integers where m ranges from 0 to 3 and the sum of $m$ and $n$ is 6, halogenated biphenyl compounds of the formula (II) 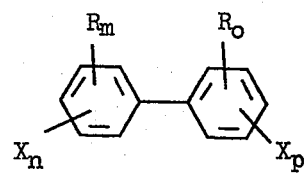

where R is selected from the group consisting of hydrogen atom, alkyl radicals containing from 1 to 4 carbon atoms and halogen substituted alkyl radicals containing from 1 to 4 carbon atoms in which said halogen atoms are selected from the group consisting of bromine and chlorine, X is selected from the group consisting of bromine and chlorine, $m$, $n$, $o$ and $p$ are integers where $m$ and $o$ ranged from 0 to 3 and the sum of $m$ and $n$ is 5 and the sum of $o$ and $p$ is 5 and halogenated naphthalene compounds of the formula (III) 

where X is selected from the group consisting of bromine and chlorine atoms and $j$ and $k$ are integers ranging from 2 to 4 and the sum of $j$ and $k \geq 4$ and (2) from 0.1 to 3.0 percent by weight, based on the weight of the polyester or copolyester, of at least one compound selected from the group consisting of alkali metal tetrafluoroborates.

6. The composition of claim 5 wherein the polyester is polyethylene terephthalate and the synergistic mixture consists of from 1 to 10 percent by weight of bromine atom as octabromobiphenyl and from 0.1 to 3.0 percent by weight of an alkali metal tetrafluoroborate selected from the group consisting of sodium tetrafluoroborate and potassium tetrafluoroborate, all based on the weight of the polyester.

7. The composition of claim 5 in the form of a filament.

8. The composition of claim 5 in the form of a fiber.

9. The composition of claim 5 in the form of a film.

* * * * *